United States Patent [19]

Bachmann et al.

[11] 4,271,886
[45] Jun. 9, 1981

[54] TREAD FOR RADIAL TIRES OF TRUCKS AND SIMILAR VEHICLES

[75] Inventors: Willi Bachmann, Isernhagen; Klaus Thielemann, Hildesheim; Klaus von der Wall, Wölpinghausen, all of Fed. Rep. of Germany

[73] Assignee: Continental Gummi-Werke Aktiengesellschaft, Hanover, Fed. Rep. of Germany

[21] Appl. No.: 84,418

[22] Filed: Oct. 12, 1979

[30] Foreign Application Priority Data

Oct. 14, 1978 [DE] Fed. Rep. of Germany ....... 2844853

[51] Int. Cl.³ .............................................. B60C 11/06
[52] U.S. Cl. ................................................ 152/209 R
[58] Field of Search ....... 152/209 R, 209 D, 209 WT, 152/209 NT; D12/141, 142, 145

[56] References Cited

U.S. PATENT DOCUMENTS

| 3,789,898 | 2/1974 | Montagne | 152/209 R |
| 3,799,230 | 3/1974 | Montagne | 152/209 R |
| 3,831,654 | 8/1974 | Boileau | 152/209 R |
| 3,841,374 | 10/1974 | Boileau | 152/209 R |
| 3,897,813 | 8/1975 | Verdier | 152/209 R |

FOREIGN PATENT DOCUMENTS 2711066  9/1977  Fed. Rep. of Germany ...... 152/209 D

Primary Examiner—Michael W. Ball
Attorney, Agent, or Firm—Becker & Becker, Inc.

[57] ABSTRACT

A tread or tread profile, especially for radial tires of trucks and similar vehicles, is disclosed. The tread includes six profile ribs arranged symmetrically to the circumferential center of the tire. Grooves of zigzag or similar wave patterns are provided between the profile ribs. The lateral profile ribs at the shoulders of the tire have a width which is about two times the width of a central profile rib and the pertaining lateral grooves are about ⅓ the width of the central groove. The tire can also be provided with radial recesses in the shoulder of the lateral profile ribs.

5 Claims, 2 Drawing Figures

Section A—B

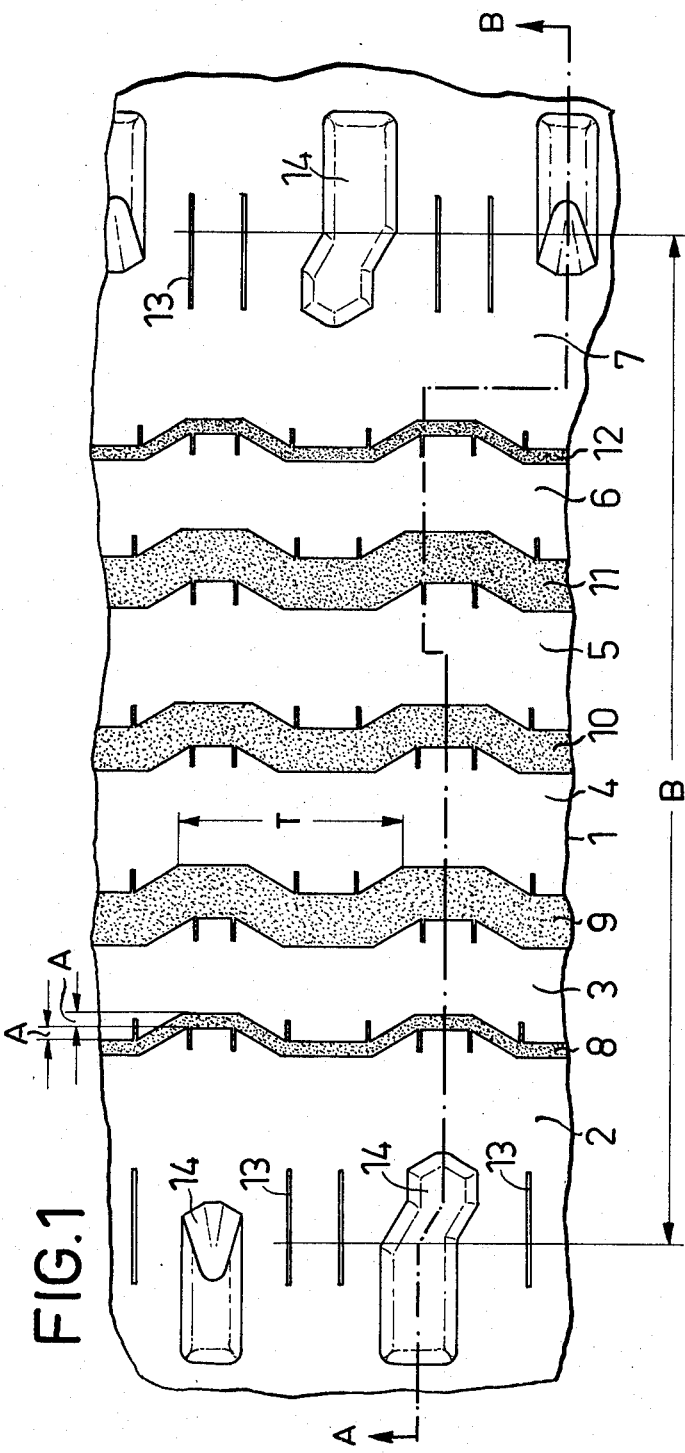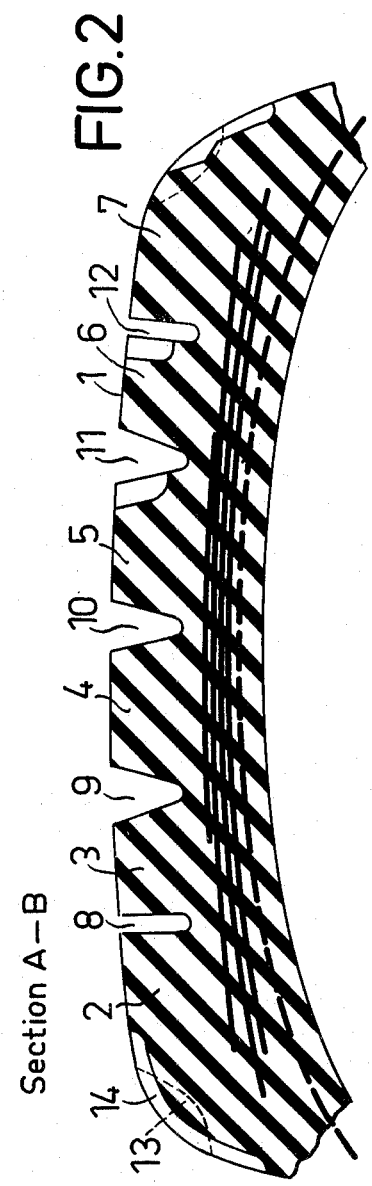

TREAD FOR RADIAL TIRES OF TRUCKS AND SIMILAR VEHICLES

The present invention relates to a tread for radial tires of trucks and similar vehicles. More particularly, the invention relates to a tread or tread profile for radial tires with six circumferential profile ribs arranged symmetrically in relation to the circumferential tread center, these profile ribs are of varying widths, delineated by zigzag or wave-like circumferential grooves, and separated from one another.

Pneumatic vehicle tires are known in which the tread is provided by three ribs approximately equal in width, and the ribs are separated by zigzag-like circumferential grooves. However, they may also further be divided so that each profile rib is divided at the approximate center or half width thereof, by a small circumferential groove. These treads are to exhibit over their full width a substantial contact or adhesion capability. In addition, an even wear should occur over the width of the tread strip.

It is an object of the present invention to improve the aforementioned tread profile in such a way that in comparison with the mentioned known tread profiles additionally along with a uniform wear over the width of the tread a substantial increase of the contact or adhesion capability and, thereby, an improved or increased traction is obtained.

These objects and advantages of the invention will appear more clearly from the following specification in connection with the accompanying drawings, in which:

FIG. 1 is a top plan view of a portion of a tire, that shows the tread of a radial tire intended for use on trucks; and FIG. 2 is a radial cross section taken along A—A in FIG. 1 through the tread portion of the tire in accordance with the present invention.

The tread in accordance with the present invention is characterized primarily therein that the circumferential lateral profile ribs which provide the edges of the tread are approximately twice as wide in comparison to the other circumferential profile ribs and they are separated, respectively, from the adjacent ribs by a circumferential groove which is about ⅓ the width of the other circumferential groove. Preferably, the width of the narrower circumferential groove is about 1 to 2% the width of the tread or tread strip, while the width of the other circumferential grooves is approximately 4 to 5% of the tread width. In addition, advantageously the circumferential ribs, which are provided between the two lateral profile ribs, have a width of approximately 8 to 13% of the tread width.

The amplitude of the pertaining zigzag or wave pattern corresponds to about 1 to 2% of the width of the tread, while the length of amplitude corresponds to about 18 to 25% of the width of the tread.

Advantageously also radial recesses having a length of from about 0.2 to about 0.5% of the width of the tread can be provided which can alternate with further radial recesses arranged about the circumference of the tire. The further recesses have a depth of from about 0.5% to about 3% of the width of the tread. Preferably, the length of any radial recess is from about 0.25 to about 0.5 of the width of the lateral profile ribs.

Referring now particularly to the drawings, the tread or tread surface 1 has a width B as indicated in FIG. 1.

The tread is substantially provided by six (6) circumferential ribs 2,3,4,5,6, and 7.

The lateral circumferential profile ribs 2 and 7 have a width of about two times the width of the other circumferential profile ribs 3,4,5, and 6. Circumferential grooves are arranged between pertaining circumferential ribs. Thus, approximately zigzag circumferential grooves 8,9,10,11, and 12 are provided. It is important that the circumferential grooves 8 and 12, which are between the ribs 2 and 3, and 6 and 7, respectively, have a width which is about ⅓ the width of the centrally arranged circumferential grooves 9,10, and 11. Viewed overall, the circumferential grooves 8 and 12, thereby have a width of about 1.5% of the width B of the tread, while the width of the grooves 9, 10, and 11, is approximately 4 to 5% of the width B.

While the circumferential ribs 3 and 6 are somewhat narrower, in comparison to the circumferential ribs 4 and 5, all the circumferential ribs 3,4,5, and 6 are approximately of equal width, which is about 8 to 13% of the width B of the tread.

The traction behavior of the pneumatic tire to a large extent is determined by an amplitude A of the circumferential grooves or the limiting edges thereof. This amplitude A along the edge of a pertaining groove should be about 1 to 2% of the value of B. The location of the amplitude "A" of the circumferential grooves or the limiting edges upwardly and downwardly in the locations thereof can be seen as indicated in FIG. 1. Also the length of the amplitude is important. The length of amplitude or the division T is to be about 80–25% under the aforementioned preconditions of the value of B.

It has been shown furthermore that a particular configuration of the lateral boundary surfaces is of importance for traction and lateral guiding forces, and particularly with regard to a wear as uniform as possible over the full width of the tread surface.

Advantageous for this are rather narrow or wider recesses or cuts. Again, a combination is possible in that a selection can be made with regard to the extent in the circumferential direction of the tire and to the extent in radial direction (depth).

The laterally outwardly arranged recesses are to have an extent, when measured in the circumferential direction of the tire, which does not exceed 0.5% of the width B, and which is preferably not less than 0.2% of this value. The depth of these recesses arranged over the circumference of the tire, measured in radial direction, is not to exceed the value of from 1 to 3% of B, but should in any event be greater than 0.5% of the tread width B. Consequently, also the transverse extent of these narrow recesses is critical. The transverse extent is to be about ¼ to ½ of the width of the lateral profile ribs 2 and 7. The recesses, the width of which is not to exceed about 0.5% of the value of B and are designated by numeral 13, while the other recesses with the aforementioned radial extent are designated by reference numeral 14.

A tread in accordance with the present invention exhibits favorable wear characteristics. Primarily, however, with the aforementioned dimensioning, a uniform wear characteristic over the tread strip width and, simultaneously, a substantially enhanced traction is realized.

The present invention is, of course, in no way restricted to the specific disclosure of the specification and drawings, but also encompasses any modifications within the scope of the appended claims.

What we claim is:

1. A tire tread extending from shoulder to shoulder, especially for radial tires of trucks and similar vehicles, comprising in combination:

a circumferential lateral profile rib for each shoulder of said tire; and a plurality of central circumferential profile ribs including four central profile ribs left free of any further subdivision to assure stability as well as being more durable to stand rigidly and located between said lateral profile ribs, said central profile ribs being separated from one another only by central grooves extending about the circumference of said tire in a wave pattern, said lateral profile ribs having a width of about two times the width of a central profile rib, with a lateral groove located between each of said lateral profile ribs and a pertaining adjacent central profile rib and extending about the circumference of said tire in a wave pattern, said lateral grooves having a width of about ⅓ the width of a central groove, said central profile ribs and said lateral profile ribs being arranged symmetrically to the circumferential tread center, said grooves and said central ribs extending in a regular zigzag pattern, the width of each of said lateral grooves corresponding to about 1 to 2% of the width of said tread, and the width of each of said central grooves corresponding to about 4 to 5% of the width of said tread, each of said central profile ribs having a width corresponding to about 8 to 13% of the width of said tread, said zigzag pattern having an amplitude "A" upwardly and downwardly along an edge of a pertaining groove corresponding to about 1 to 2% of the width of said tread, said pattern being repeated after a distance of about 18 to 25% of the width of said tread.

2. A tire tread in combination according to claim 1, wherein in each shoulder of said lateral profile ribs there are provided first lateral recesses of a width up to about 0.5% of the width of said tread when measured in the circumferential direction of said tire.

3. A tire tread in combination according to claim 2, wherein said first lateral recesses have a width of at least about 0.2% of the width of said tread.

4. A tire tread in combination according to claim 2, wherein in each shoulder of said lateral profile ribs there are provided second lateral recesses arranged about the circumference of said tire, said second recesses having a depth of from about 0.5% to about 3% of the width of said tread.

5. A tire tread in combination according to claim 4, wherein the length of said first and second recesses, measured in a direction transverse to the circumferential direction of said tire, is in a range of about 0.25 to about 0.5 the width of a lateral profile rib.

* * * * *